(12) United States Patent
Chang

(10) Patent No.: US 9,615,156 B1
(45) Date of Patent: Apr. 4, 2017

(54) ENGAGING STRUCTURE FOR INSTALLATION OF A LOUDSPEAKER

(71) Applicant: Tzu-Chung Chang, Kaohsiung (TW)

(72) Inventor: Tzu-Chung Chang, Kaohsiung (TW)

( * ) Notice: Subject to any disclaimer, the term of this patent is extended or adjusted under 35 U.S.C. 154(b) by 0 days.

(21) Appl. No.: 14/855,416

(22) Filed: Sep. 16, 2015

(51) Int. Cl.
*H04R 1/02* (2006.01)

(52) U.S. Cl.
CPC ............ *H04R 1/026* (2013.01); *H04R 1/025* (2013.01); *H04R 2201/021* (2013.01); *H04R 2201/029* (2013.01)

(58) Field of Classification Search
CPC .......... H04R 1/02; H04R 1/025; H04R 1/026; H04R 2201/021; H04R 2201/029; F21V 21/041–21/049
See application file for complete search history.

(56) References Cited

U.S. PATENT DOCUMENTS

2004/0258269 A1\* 12/2004 Halsall ................... H04R 1/025
  381/387

2015/0090851 A1\* 4/2015 Fujiu ........................ G06F 1/16
  248/316.5

\* cited by examiner

*Primary Examiner* — Curtis Kuntz
*Assistant Examiner* — Joshua Kaufman
(74) *Attorney, Agent, or Firm* — Alan D. Kamrath; Kamrath IP Lawfirm, P.A.

(57) ABSTRACT

An engaging structure is used for installation of a loudspeaker into an installation hole of a partition. The installation hole extends through first and second faces of the partition. The engaging structure includes a receiving portion and a plurality of clamping units. The receiving portion has a receiving hole for receiving the loudspeaker. The clamping units are coupled with the receiving portion and surround the receiving hole. Each clamping unit includes first and second clamping members. The first clamping member includes a first end connected to a first end of the second clamping member, and a second end connected to a first wheel. The first wheel abuts with an inner periphery of the partition. The second clamping member includes a second end connected to a second wheel, and the second wheel abuts with one of the first and second faces of the partition.

11 Claims, 4 Drawing Sheets

ENGAGING STRUCTURE FOR INSTALLATION OF A LOUDSPEAKER

BACKGROUND OF THE INVENTION

1. Field of the Invention

The present invention generally relates to an engaging structure and, more particularly, to an engaging structure for installation of a loudspeaker.

2. Description of the Related Art

Music is entertaining and makes people relaxed. When playing music, a loudspeaker system may be engaged into a ceiling plate or a wall plate in order not to occupy a large indoor space. An example of such a loudspeaker system is the in-ceiling speaker system or the in-wall speaker system.

Conventionally, the loudspeaker system is installed in the ceiling plate or wall plate in a screwing manner. Specifically, during the installation of a loudspeaker, the loudspeaker must be placed into an installation hole of the ceiling plate or wall plate. Then, one needs to hold the loudspeaker up by hand while screwing the loudspeaker (using a screwing tool such as a screwdriver) to the ceiling plate or wall plate (a partition which separates the "real ceiling or wall" from the user's space, such as a wooden plate). However, the loudspeaker is usually heavy, and it is difficult to hold the loudspeaker up by a single hand while screwing the loudspeaker to the ceiling plate or wall plate by the other hand.

In light of this, it is necessary to improve the convenience in installation of the loudspeaker.

SUMMARY OF THE INVENTION

It is therefore the objective of this invention to provide an engaging structure for convenient installation of the loudspeaker.

In an embodiment, an engaging structure for installation of a loudspeaker into an installation hole of a partition is disclosed, in which the installation hole extends through first and second faces of the partition. The engaging structure includes a receiving portion and a plurality of clamping units. The receiving portion has a receiving hole for receiving the loudspeaker. The plurality of clamping units is coupled with the receiving portion and surrounds the receiving hole. Each of the plurality of clamping units includes a first clamping member and a second clamping member. The first clamping member includes a first end connected to a first end of the second clamping member, as well as a second end connected to a first wheel. The first wheel is adapted to abut with an inner periphery of the partition defining the installation hole. The second clamping member includes a second end connected to a second wheel, and the second wheel is adapted to abut with one of the first and second faces of the partition.

In a form shown, the receiving portion may include a plurality of engaging seats. The receiving portion may further include a first shaft extending through the first and second clamping members for each of the plurality of engaging seats.

In the form shown, the first clamping member may include a frame and a second shaft. The frame may include a first pivotal end and a second pivotal end. The first shaft may pivotally extend through the first pivotal end of the frame, and the second shaft may pivotally extend through the second pivotal end of the frame and may couple with the first wheel.

In the form shown, the first wheel includes a first cylinder and a first sleeve. The second shaft extends through the first cylinder, and the first sleeve may be fitted around the first cylinder.

In the form shown, the second clamping member may form two pivotal portions and a coupling portion. The first shaft may be pivotally connected to the two pivotal portions, and the coupling portion may be coupled with the second wheel.

In the form shown, the second clamping member is a torque spring.

In the form shown, the second wheel may include a second cylinder and a second sleeve. The second cylinder may be rotatably coupled with the coupling portion of the second clamping member, and the second sleeve may be fitted around the second cylinder.

In the form shown, the second cylinder consists of two semi-circular posts.

In the form shown, the receiving portion may further include a plurality of fixing members surrounding the receiving hole.

In the form shown, the receiving portion may further include a plurality of supporting members surrounding the receiving hole.

Based on the above engaging structure, the loudspeaker can be smoothly attached to or detached from the installation hole of the partition according to the user's requirement. Thus, the user is able to operate the engaging structure in a convenient manner without great effort, and the indoor decoration can be protected from damage without deteriorating its aesthetic effect.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
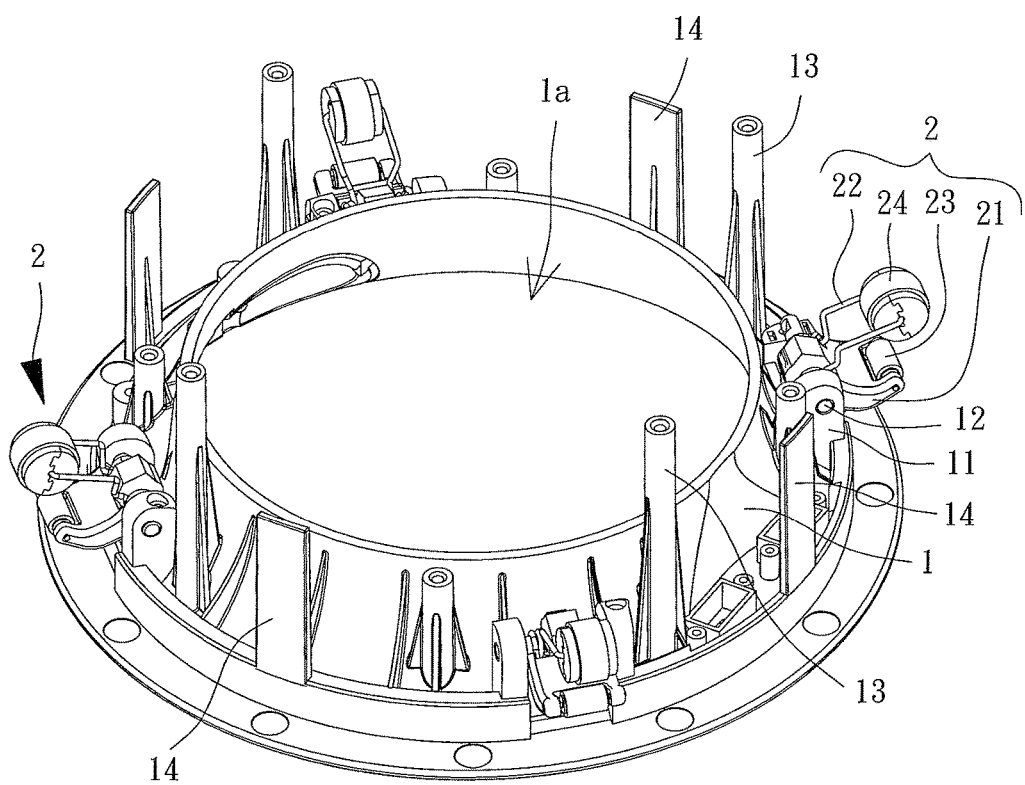
FIG. 1 is a perspective view of an engaging structure for installation of a loudspeaker according to an embodiment of the invention.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The term "partition" referred hereinafter is a structure that divides a space into two separate spaces. For example, when the partition is a ceiling plate in a room, the ceiling plate divides the room into a user's space which is below the plate, as well as an upper space which is between the plate and the "real ceiling" of the room. Alternatively, the partition may be a wall frame which is arranged outside of the room, as it can be readily appreciated by the skilled persons.

FIG. 1 is a perspective view of an engaging structure for installation of a loudspeaker (not shown, such as a circular loudspeaker). The engaging structure includes a receiving portion 1 and a plurality of clamping units 2. The receiving portion 1 may include a receiving hole 1a for receiving the loudspeaker. The clamping units 2 may be coupled with the receiving portion 1 and circumferentially arranged around the receiving hole 1a for engaging with a partition "A" (as shown in FIG. 2).

Figure 2:
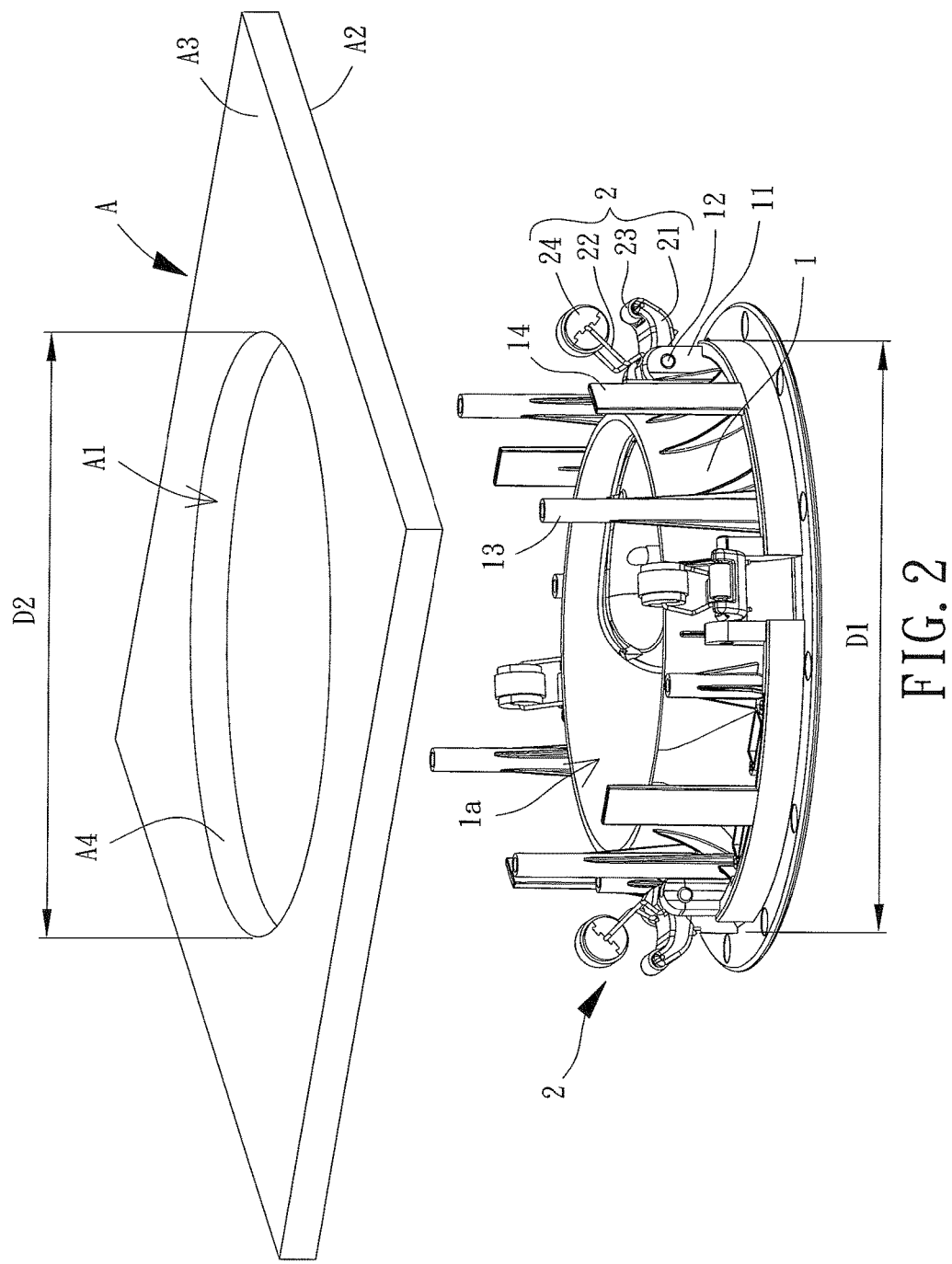
FIG. 2 shows the engaging structure and a partition before engagement according to the embodiment of the invention.

In the embodiment as shown in FIG. 2, the engaging structure may be detachably engaged into an installation hole A1 of the partition "A" (such as a ceiling plate or a wall plate). The installation hole A1 may extend through two faces A2 and A3 of the partition "A." The shape of the receiving hole 1a may vary according to the shape of the loudspeaker in order to receive the loudspeaker. The receiving portion 1 has an outer diameter D1 smaller than the diameter D2 of the installation hole A1 of the partition "A."

Figure 3:
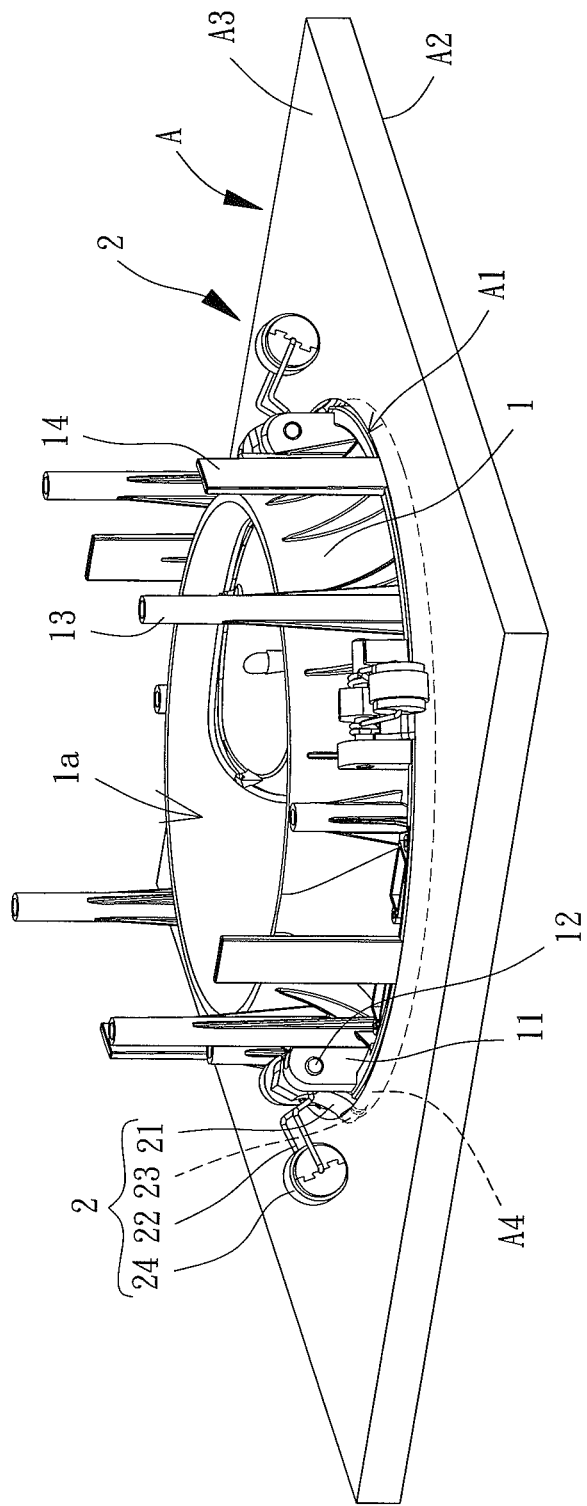
FIG. 3 shows the engaging structure and the partition after engagement according to the embodiment of the invention.

Referring to FIGS. 1 and 2 again, each clamping unit 2 may include a first clamping member 21 and a second clamping member 22. The first clamping member 21 includes a first end that may be connected to a first end of the second clamping member 22. For example, the receiving portion 1 may include a plurality of engaging seats 11. In this regard, the receiving portion 1 may include a first shaft 12 extending through the first and second clamping members 21 and 22 for each engaging seat 11. The first clamping member 21 includes a second end connected to a first wheel 23. The first wheel 23 is adapted to abut with an inner periphery A4 of the partition "A" defining the installation hole A1 (as shown in FIG. 3). The second clamping member 22 includes a second end connected to a second wheel 24. The second wheel 24 is adapted to abut the face A3 of the partition "A" (as shown in FIG. 3).

Figure 4:
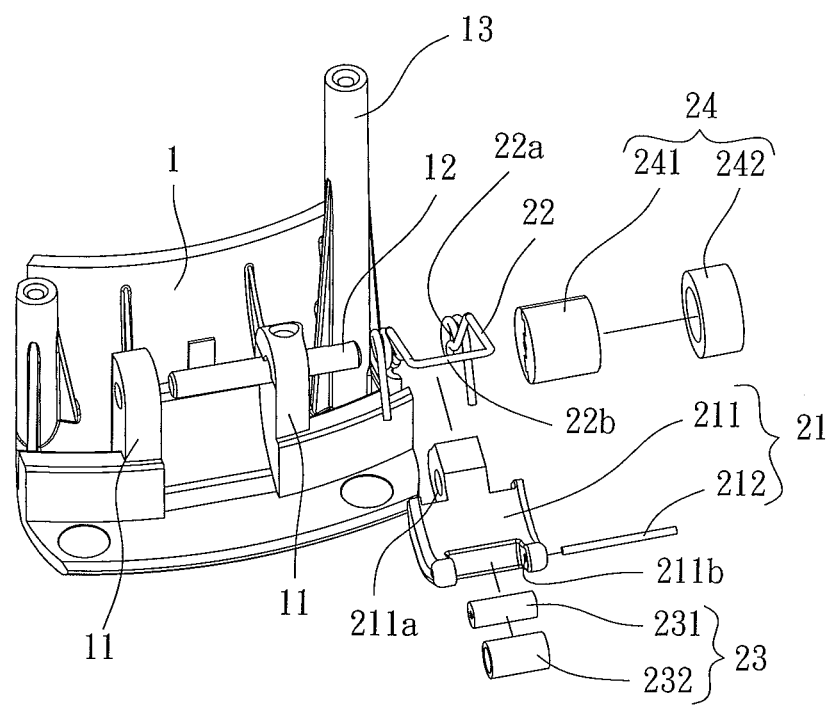
FIG. 4 is an exploded view of a clamping unit of the engaging structure according to the embodiment of the invention.

Referring to FIG. 4, in the embodiment, the first clamping member 21 may include a frame 211 and a second shaft 212. The frame 211 may include a first pivotal end 211a and a second pivotal end 211b. The first shaft 12 may pivotally extend through the first pivotal end 211a of the frame 211. The second shaft 212 may pivotally extend through the second pivotal end 211b of the frame 211 and couple with the first wheel 23. The first wheel 23 may include a first cylinder 231 and a first sleeve 232 (such as a soft plastic sleeve). The second shaft 212 may extend through the first cylinder 231, thus forming a rolling wheel. The first sleeve 232 may be fitted around the first cylinder 231 to provide a buffering function. The first sleeve 232 and the first cylinder 231 may be adhered to each other via any kind of glue.

In the embodiment, as shown in FIG. 4, the second clamping member 22 may be resilient (such as a torque spring). In addition, the second clamping member 22 may form two pivotal portions 22a and a coupling portion 22b. The first shaft 12 may be pivotally connected to the two pivotal portions 22a. The second clamping member 22 may be pulled towards the receiving hole 1a by an external force. The second clamping member 22 may restore its original position when released from the external force. The coupling portion 22b may be coupled with the second wheel 24. The second wheel 24 may include a second cylinder 241 and a second sleeve 242 (such as a soft plastic sleeve). The second cylinder 241 may rotatably couple with the coupling portion 22b of the second clamping member 22 to form another rolling wheel. The second sleeve 242 may be fitted around the second cylinder 241 to provide a buffering function. The second sleeve 242 and the second cylinder 241 may be adhered to each other via any kind of glue. Furthermore, the second cylinder 241 may consist of two semi-circular posts that can be engaged with or adhered to each other, such that the second cylinder 241 can be affixed to the coupling portion 22b of the second clamping member 22. However, this is not taken as a limited sense.

Referring to FIG. 1, the receiving portion 1 may further include a plurality of fixing members 13 surrounding the receiving hole 1a, as well as a plurality of supporting members 14 also surrounding the receiving hole 1a. The fixing members 13 can be used to firmly couple the loudspeaker with the receiving portion 1, and the supporting members 14 are used to jointly support the loudspeaker.

Referring to FIGS. 2 and 3, before the installation of the loudspeaker, a proper size of the installation hole A1 must be arranged on the partition "A" (ceiling plate or wall plate) as shown in FIG. 2. Then, the loudspeaker may be placed in the installation hole A1 and fixed by the fixing members 13. Next, the second clamping members 22 may be pushed towards the installation hole A1 and may roll on the inner periphery A4. When the first wheels 23 make contact with the face "A2," roll into the installation hole A1 and abut with the inner periphery A4 of the partition "A," the rolling motion of the second clamping members 22 stops. The above inner periphery A4 is located and connected between the faces A2 and A3. By the time the first wheels 23 abut with the inner periphery A4 of the partition "A," the second wheels 24 already roll out of the installation hole A1 and firmly press against the face A3 of the partition "A" under the elastic force of the second clamping members 22. Thus, the partition "A" may be clamped by the first clamping members 21 and the second clamping members 22 as shown in FIG. 3. Due to the elastic force, the first clamping members 21 may securely press against the inner periphery A4 of the partition "A" defining the installation hole A1, and the second clamping members 22 may securely press against the face "A3" of the partition "A." In this manner, the loudspeaker is successfully arranged in the installation hole A1. Thus, the installation of the loudspeaker is finished. When it is required to detach the loudspeaker from the partition "A," a force may be applied to the receiving portion 1 to pull both the receiving portion 1 and the loudspeaker out of the installation hole A1 (as shown in FIG. 2). Thus, the installation and detachment of the loudspeaker are convenient.

It is noted that during the use of the engaging structure of the invention, the first wheels 23 and the second wheels 24 may be operated to roll on the faces of the partition "A" in order to prevent scratching of the partition "A." Also, the first clamping members 21 and the second clamping members 22 may smoothly roll on the faces A2 and A3 of the partition "A," respectively. As a result, the installation of the loudspeaker is smooth and convenient. Moreover, when the partition "A" is clamped by the first clamping members 21 and the second clamping members 22, the first sleeves 232 and the second sleeves 242 are able to provide a buffering function for the partition "A." Advantageously, excessive pressing of the partition "A" is prevented, thereby protecting the partition "A" from damage. As such, the aesthetic effect of the indoor decoration will not be deteriorated.

As a conclusion of the above, during the use of the engaging structure of the invention, the engaging structure is able to fix the loudspeaker in the installation hole A1 of the partition "A." In the above, the installation hole A1 extends through the faces A2 and A3 of the partition "A," the receiving portion 1 may include a receiving hole 1a for receiving the loudspeaker, and the clamping units 2 may be coupled with the receiving portion 1 and may be circumferentially arranged around the receiving hole 1a. In addition, each second clamping member 22 includes the first clamping member 21 and the second clamping member 22, in which the first clamping member 21 includes the first end that may be connected to the first end of the second clamping member 22. Based on this, the first wheels 23 at the second end of the first clamping members 21 may press against the inner periphery A4 of the partition "A" defining the installation hole A1 while the second wheels 24 at the second end of the second clamping members 22 may press against the face A3 of the partition "A." Accordingly, the first clamping members 21 and the second clamping members 22 may jointly clamp the partition "A." Thus, the installation of the loudspeaker is convenient. If the user needs to detach the loudspeaker from the partition "A," it is simply required to pull the receiving portion 1 along with the loudspeaker from the installation hole A1.

Thus, the engaging structure of the invention allows the loudspeaker to be smoothly attached to or detached from the installation hole A1 of the partition "A" according to the user's requirement. Thus, the user is able to operate the engaging structure in a convenient manner without great effort, and the indoor decoration can be protected from damage without deteriorating its aesthetic effect.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An engaging structure for installation of a loudspeaker into an installation hole of a partition, wherein the installation hole extends through first and second faces of the partition, wherein the engaging structure comprises:
   a receiving portion having a receiving hole for receiving the loudspeaker; and
   a plurality of clamping units coupled with the receiving portion and surrounding the receiving hole, wherein each of the plurality of clamping units comprises a first clamping member and a second clamping member separately formed from the first clamping portion, wherein the first clamping member comprises a first end connected to a first end of the second clamping member, as well as a second end of a U-shape, with a first wheel rotatably mounted in the U-shape and adapted to abut with an inner periphery of the partition defining the installation hole, wherein the second clamping member comprises a coupling portion extending between two pivotal portions, with a second wheel rotatably mounted to the coupling portion between the two pivotal portions and adapted to abut with one of the first and second faces of the partition.

2. The engaging structure for installation of the loudspeaker into the installation hole of the partition as claimed in claim 1, wherein the receiving portion comprises a plurality of engaging seats, and wherein the receiving portion further comprises a first shaft extending through the first and second clamping members for each of the plurality of engaging seats.

3. The engaging structure for installation of the loudspeaker into the installation hole of the partition as claimed in claim 2, wherein the first clamping member comprises a frame and a second shaft, wherein the frame comprises the first end and the second end of the first clamping member, wherein the first shaft pivotally extends through the first end of the frame, and wherein the second shaft pivotally extends through the U-shape of the second end of the frame and rotatably couples with the first wheel.

4. The engaging structure for installation of the loudspeaker into the installation hole of the partition as claimed in claim 3, wherein the first wheel comprises a first cylinder and a first sleeve, wherein the second shaft extends through the first cylinder, and wherein the first sleeve is fitted around the first cylinder.

5. The engaging structure for installation of the loudspeaker into the installation hole of the partition as claimed in claim 2, wherein the first shaft is pivotally connected to the two pivotal portions, and wherein the coupling portion is rotatably coupled with the second wheel.

6. The engaging structure for installation of the loudspeaker into the installation hole of the partition as claimed in claim 5, wherein the second clamping member is a torque spring with each of the two pivotal portions including spring coils, with the first end of the first clamping member located between the spring coils of the two pivotal portions, and with the first shaft extending through the spring coils of the two pivotal portions.

7. The engaging structure for installation of the loudspeaker into the installation hole of the partition as claimed in claim 5, wherein the second wheel comprises a second cylinder and a second sleeve, wherein the second cylinder is rotatably coupled with the coupling portion of the second clamping member, and wherein the second sleeve is fitted around the second cylinder.

8. The engaging structure for installation of the loudspeaker into the installation hole of the partition as claimed in claim 7, wherein the second cylinder consists of two semi-circular posts.

9. The engaging structure for installation of the loudspeaker into the installation hole of the partition as claimed in claim 1, wherein the receiving portion further comprises a plurality of fixing members surrounding the receiving hole.

10. The engaging structure for installation of the loudspeaker into the installation hole of the partition as claimed in claim 1, wherein the receiving portion further comprises a plurality of supporting members surrounding the receiving hole.

11. The engaging structure for installation of the loudspeaker into the installation hole of the partition as claimed in claim 1, wherein the second wheel has a diameter greater than the first wheel.

* * * * *